(12) United States Patent
Valdivia et al.

(10) Patent No.: US 12,230,964 B2
(45) Date of Patent: Feb. 18, 2025

(54) DC POWER SUPPLY DEVICE AND RAILWAY SUBSTATION INCORPORATING IT

(71) Applicant: SÉCHERON SA, Satigny (CH)

(72) Inventors: Virgilio Valdivia, Getafe Madrid (ES); Ramón Vázquez, Valdemoro Madrid (ES); Francisco Jose Moreno Muñoz, Bera Navarra (ES)

(73) Assignee: SÉCHERON SA, Satigny (CH)

( * ) Notice: Subject to any disclaimer, the term of this patent is extended or adjusted under 35 U.S.C. 154(b) by 0 days.

(21) Appl. No.: 18/263,803

(22) PCT Filed: Feb. 1, 2022

(86) PCT No.: PCT/IB2022/050865
§ 371 (c)(1),
(2) Date: Aug. 1, 2023

(87) PCT Pub. No.: WO2022/175770
PCT Pub. Date: Aug. 25, 2022

(65) Prior Publication Data
US 2024/0120738 A1    Apr. 11, 2024

(30) Foreign Application Priority Data
Feb. 19, 2021    (EP) .................................... 21158070

(51) Int. Cl.
*H02J 3/16*    (2006.01)
*B60L 7/00*    (2006.01)
*H02M 7/5387*    (2007.01)

(52) U.S. Cl.
CPC ........... *H02J 3/16* (2013.01); *H02M 7/53871* (2013.01); *B60L 7/00* (2013.01)

(58) Field of Classification Search
CPC .......... H02J 3/16; H02M 7/53871; B60L 7/00
(Continued)

(56) References Cited

U.S. PATENT DOCUMENTS

| 8,146,513 B2 * | 4/2012 | Ibaiondo Madariaga ................... B60M 3/06 700/286 |
| 10,554,117 B2 | 2/2020 | Bou-saada et al. |
| 2019/0305688 A1 | 10/2019 | Seymour |

FOREIGN PATENT DOCUMENTS

| AU | 523146 B2 | 7/1982 |
| CN | 202906763 U | 4/2013 |

(Continued)

OTHER PUBLICATIONS

Daniel Cornic, "Efficient recovery of braking energy through a reversible dc substation", Proc. of Electrical Systems for Aircraft, Railway and Ship Propulsion Conference, 2010, 9 pages.

(Continued)

*Primary Examiner* — Hal Kaplan
(74) *Attorney, Agent, or Firm* — NIXON & VANDERHYE, PC

(57) ABSTRACT

Disclosed is a DC power supply device that includes: a transformer having a primary side and a secondary side; a diode rectifier connected at its input side to the secondary side of the transformer; an inverter connected at its output side to the secondary side of the transformer; and a controller. The inverter is controlled by the controller to generate reactive power and/or harmonics onto the secondary side of the transformer so as to regulate the DC voltage at the output side of the diode rectifier to a target value. The controller receives at its input side at least one DC signal outputted by the diode rectifier and uses the at least one DC signal to control the inverter.

23 Claims, 12 Drawing Sheets

(58) Field of Classification Search
USPC .......................................................... 307/9.1
See application file for complete search history.

(56) References Cited

FOREIGN PATENT DOCUMENTS

| | | | |
|---|---|---|---|
| CN | 102267405 | B | 11/2013 |
| CN | 102774294 | B | 11/2014 |
| CN | 204333980 | U | 5/2015 |
| CN | 105226969 | B | 8/2018 |
| CN | 212323740 | U | 1/2021 |
| EP | 2343213 | B1 | 3/2017 |
| EP | 3091631 | A1 | 11/2019 |

OTHER PUBLICATIONS

Leonardo Rodrigues Limongi, et al., "Comparing the Performance of Digital Signal Processor-Based Current Controllers for Three-Phase Active Power Filters", Digital Current-Control Schemes, IEEE Industrial Electronics Magazine, Mar. 2009, pp. 20-31 (12 pages).

Isabel Quesada, et al., "Evaluation of the boundaries of the solutions space for the Harmonic Cancellation Technique", Carlos III University of Madrid, SEPSA, Sistemas Electronicos de Potencia S.A., 2012, pp. 21-25 (5 pages).

Sang-Hoon Song, et al., "Regeneration inverter system for DC traction with harnronic reduction capability", The 30th Annual Conference of the IEEE Industrial Electronics Society, Nov. 2-6, 2004, pp. 1463-1468 (6 pages).

International Search Report and Written Opinion of the ISA for PCT/IB2022/050865 mailed Apr. 4, 2022, 12 pages.

* cited by examiner

DC POWER SUPPLY DEVICE AND RAILWAY SUBSTATION INCORPORATING IT

CROSS-REFERENCE TO RELATED APPLICATIONS

This application is the US national stage of PCT/I62022/050865, filed Feb. 1, 2022, which claims the priority of EP 21158070.9, filed Feb. 19, 2021. The entire contents of each foregoing application are incorporated herein by reference.

BACKGROUND OF THE INVENTION

Field of the Invention

The present invention relates to a DC power supply device for supplying direct current for the traction of trains, tramways and the like. According to a particular application, the DC power supply device is incorporated in a DC railway substation.

Description of the Related Art

DC power supply devices generally include a rectifier connected to an AC power distribution network via a transformer, with the rectifier being formed of one or more diode bridges. A drawback of such DC power supply devices is the drop of DC line voltage as the load (e.g., vehicle power) increases, due to the presence of a series leakage reactance and a serial resistance. This voltage drop leads to the following issues:
 the spacing between substations must be limited to compensate voltage drops; under heavy loads, the DC catenary voltage may drop excessively and, as a consequence, the current may increase excessively, which causes operational problems, such as dissipation, heat or circuit breaking, in the power converters installed in the vehicle.

Thyristor rectifiers are gradually being adopted to address these issues in new substation systems. Thyristor rectifiers allow controlling the DC voltage. However, they are not exempt of drawbacks:
 existing traction-rectifier units need to be fully replaced;
 they are more expensive than diode rectifiers;
 they exhibit lower power factor.

Besides voltage drop issues, both diode rectifiers and thyristor rectifiers exhibit unidirectional power flow, i.e., during braking events, the energy flowing through the DC line that cannot be captured by other trains needs to be wasted in large braking resistors. In order to address this limitation, regenerative inverters, either based on insulated-gate bipolar transistors (IGBTs) or thyristors, are being incorporated to railway substations. Substations fitted with inverters are called reversible substations. A number of power electronics architectures for reversible substations are found in the state of the art, which can be mainly sorted within three groups:
 a diode rectifier associated with an inverter, as disclosed in the patent documents AU523146B, CN10277429B, CN105226969B, CN204333980U, EP3091631A1, EP2343213B1, CN102267405B and CN202906763U;
 a thyristor rectifier associated with an inverter, as disclosed in the article "Efficient recovery of braking energy through a reversible DC substation" by D. Cornic, published in proc. of Electrical Systems for Aircraft, Railway and Ship Propulsion Conference, 2010;
 bidirectional pulse width modulated (PWM) converters based on IGBTs, see U.S. Pat. No. 10,554,117.

The braking power is typically 25% to 30% of the motoring power. The large difference of power levels in each power flow direction makes the use of diode rectifiers combined with pulse width modulated (PWM) inverters, in particular PWM inverters based on IGBTs, a suitable choice from a cost perspective. Moreover, those allow retrofitting (i.e., the transformer-rectifier section does not need to be replaced). However, they still show limitations with respect to DC-link voltage controllability.

Some solutions, such as those disclosed in the patent documents CN102774294B, CN102267405B and CN202906763U, propose to regulate the DC voltage through active power injection, i.e., by sharing the active power supplied to the DC line between the PWM inverter and the diode rectifier. However, a high inverter power rating is required to mitigate the DC voltage drop across the entire operating range of the rectifier.

Another solution is proposed in the utility model CN 212323740 U, which consists in compensating the reactive current and the harmonic current drawn by the diode rectifier by providing reactive current and harmonic current of the same magnitude but opposite in phase. With this method, the DC voltage at the output side of the rectifier is necessarily stabilized at or near the no-load voltage of the rectifier, i.e. well above the nominal voltage of the rectifier, which considerably increases the inverter power rating required and thus the power consumption of the inverter and reduces the overall energy efficiency of the system. Moreover, this method requires monitoring the reactive current and harmonics circulating at the AC terminals of the diode rectifier, thereby impacting the complexity and cost of the system, as this typically will require additional current and voltage sensors.

SUMMARY OF THE INVENTION

The present invention aims at remedying the above-mentioned drawbacks and provides to this end a DC power supply device comprising:
 a transformer having a primary side and a secondary side,
 a diode rectifier connected at its input side to the secondary side of the transformer,
 an inverter connected at its output side to the secondary side of the transformer, and
 a controller arranged to control the inverter such that the inverter generates reactive power and/or harmonics onto the secondary side of the transformer so as to regulate the DC voltage at the output side of the diode rectifier to a target value,
 wherein the controller receives at its input side at least one DC signal outputted by the diode rectifier and uses said at least one DC signal to control the inverter.

Particular embodiments of the invention are defined in the appended dependent claims.

The present invention also provides a railway substation including the DC power supply device defined above.

BRIEF DESCRIPTION OF THE DRAWINGS

Other features and advantages of the present invention will be apparent upon reading the following detailed description made with reference to the appended drawings in which.

DETAILED DESCRIPTION

Figure 1:
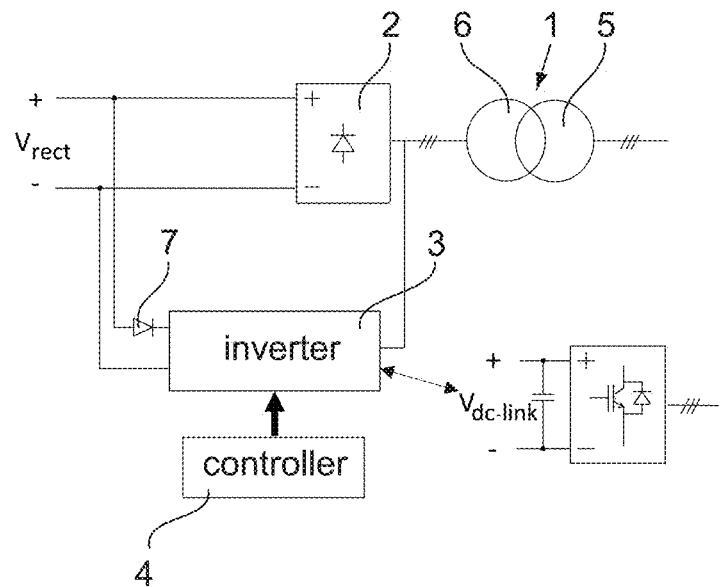
FIG. 1 shows a DC power supply device according to the invention.

Referring to FIG. 1, a DC power supply device according to the present invention, for a DC railway substation, comprises a transformer 1, a diode rectifier 2, an inverter (DC/AC converter) 3 and a controller 4. The primary side 5 of the transformer 1 receives power from an AC distribution network, typically a three-phase AC distribution network, more particularly a three-phase medium-voltage AC distribution network. The secondary side 6 of the transformer 1 delivers AC power to the input side of the diode rectifier 2. The diode rectifier 2 outputs a DC voltage, Vrect, which is delivered to a railway line for the traction of trains. The inverter 3 receives at its input side the DC voltage Vrect and its output side is connected to the secondary side 6 of the transformer 1. One or more diodes 7 at the input side of the inverter 3 makes the inverter 3 unidirectional. The inverter 3 is preferably a pulse width modulated (PWM) inverter, such as a PWM inverter based on IGBTs, MOSFETs (Metal Oxide Semiconductor Field Effect Transistors) or IGCTs (Integrated Gate-Commutated Thyristors). Different inverter topologies can be used, including two-level inverters and multi-level inverters.

During traction phases, the railway line is fed with the DC voltage Vrect deriving from the AC distribution network through the transformer 1 and the diode rectifier 2 and the controller 4 controls the inverter 3 so that the DC voltage Vrect is regulated to a target value Vrect*, as will be explained later. During braking phases, the DC power generated by the braking of the train is converted by the inverter 3 into AC power which is injected through the transformer 1 into the AC distribution network. This avoids the DC braking power being dissipated in the DC network and enables a significant part of the traction power to be recovered.

Various implementations for the transformer 1, diode rectifier 2 and inverter 3 are possible. As shown in FIGS. 2 to 6, the transformer 1 may be a delta-wye transformer and the diode rectifier 2 may comprise two diode bridges 8, such as two six-pulse diode bridges, each connected to a respective one of the secondary windings of the delta-wye transformer. The inverter 3 may include (see FIG. 2) two three-phase power semiconductor bridges 9 receiving the DC voltage Vrect through respective DC filters 10 and connected at their outputs to the two secondary windings, respectively, of the transformer 1 through respective AC filters 11. A tap in the secondary windings of the transformer 1 may be used to adjust the AC voltage level at the output side of the inverter 3. Instead of using taps, a transformer 12 (see FIG. 3) or an auto-transformer 13 (see FIG. 4) may be provided between each AC filter 11 and the corresponding secondary winding of the transformer 1. Instead of having two power semiconductor bridges 9, the inverter 3 may include a single three-phase power semiconductor bridge 9 receiving the DC voltage Vrect through a DC filter 10 and connected at its output to the secondary windings of the transformer 1 through a delta-wye transformer 14 and AC filters 11 (FIG. 5) or through an autotransformer 15 and AC filters 11 (FIG. 6).

When one or more transformers 12, 14 are used at the output side of the power semiconductor bridge(s) 9 (FIGS. 3 and 5), a single diode 7 is sufficient at the input side of the/each DC filter 10 due to the galvanic isolation provided by the transformers 12, 14. When no transformer or one or more autotransformers 13, 15 are used at the output side of the power semiconductor bridge(s) 9 (FIGS. 2, 4 and 6), two diodes 7 (one for each polarity + and −) are provided to avoid recirculation.

The DC and AC filters 10, 11 include typically inductors and possibly capacitors and resistors. Adaptation of voltage levels may be required on the AC side in order to prevent the inverter 3 from over-modulating. Such adaptation can be done by the transformers 12 (FIG. 3), the autotransformers 13 (FIG. 4) or the taps incorporated in the transformer 1 (FIG. 2).

Figure 2:
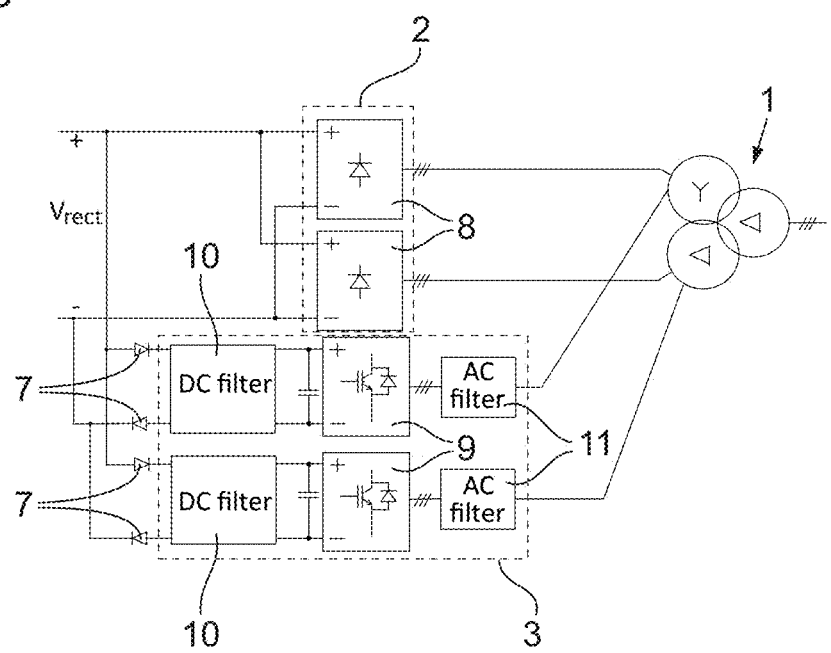
FIGS. 2 to 6 show different possible implementations of a transformer, a diode rectifier and an inverter of the DC power supply device according to the invention.
Figure 3:
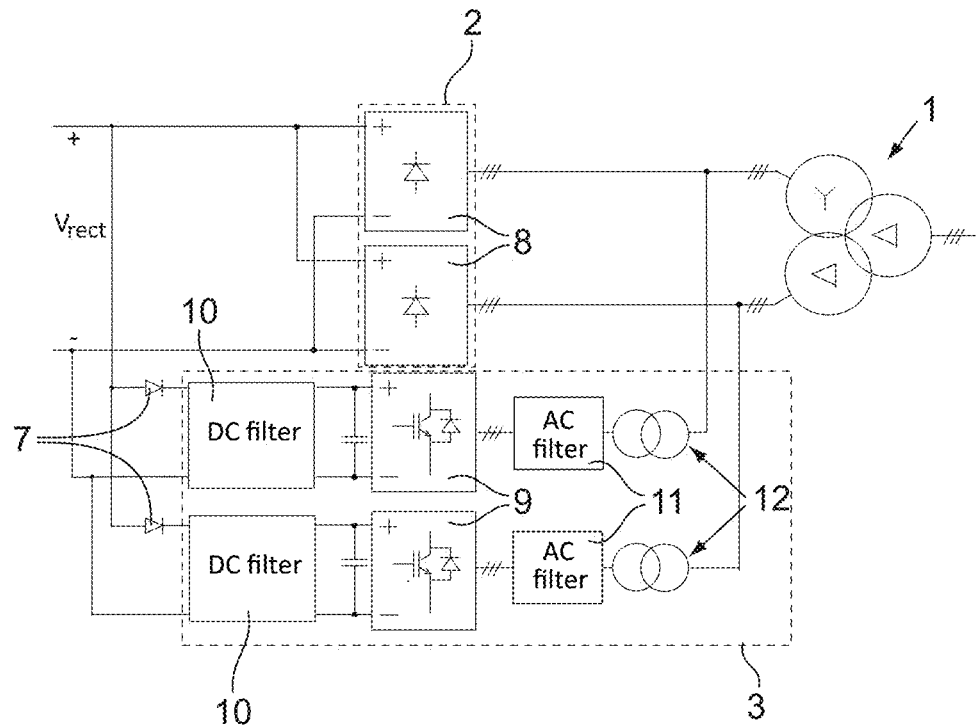
Figure 4:
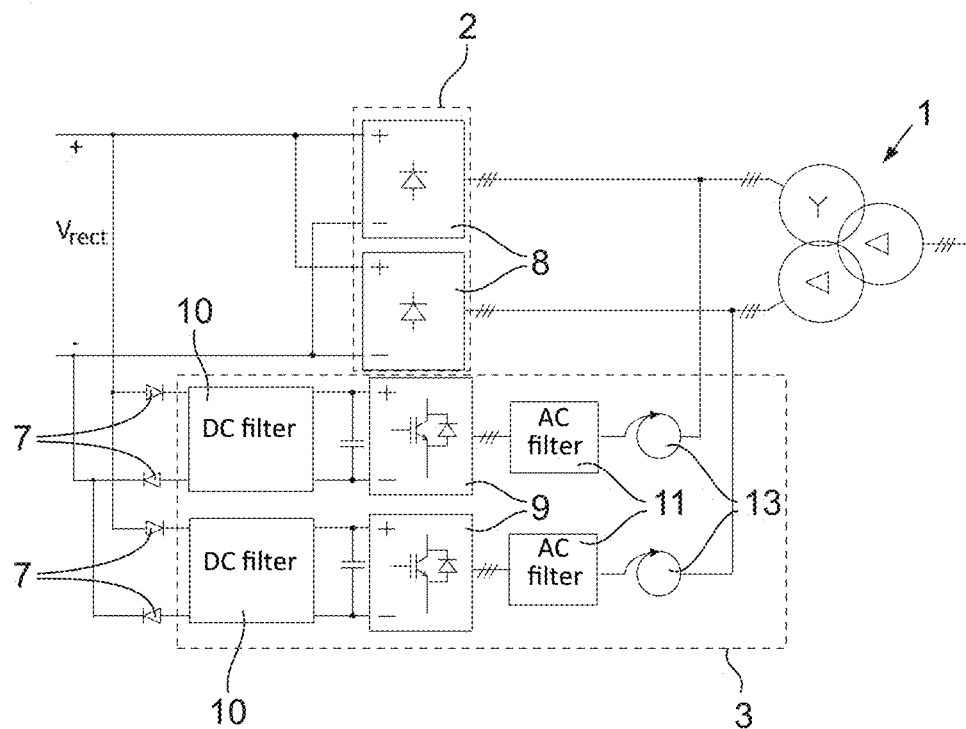

The architectures presented in FIGS. 2 to 4 can be adapted to a series connection of rectifier diode bridges, which is typically found in 3000 Vdc railway networks. In this case, the inverter power semiconductor bridges 9 would be connected in series rather than in parallel.

Figure 5:
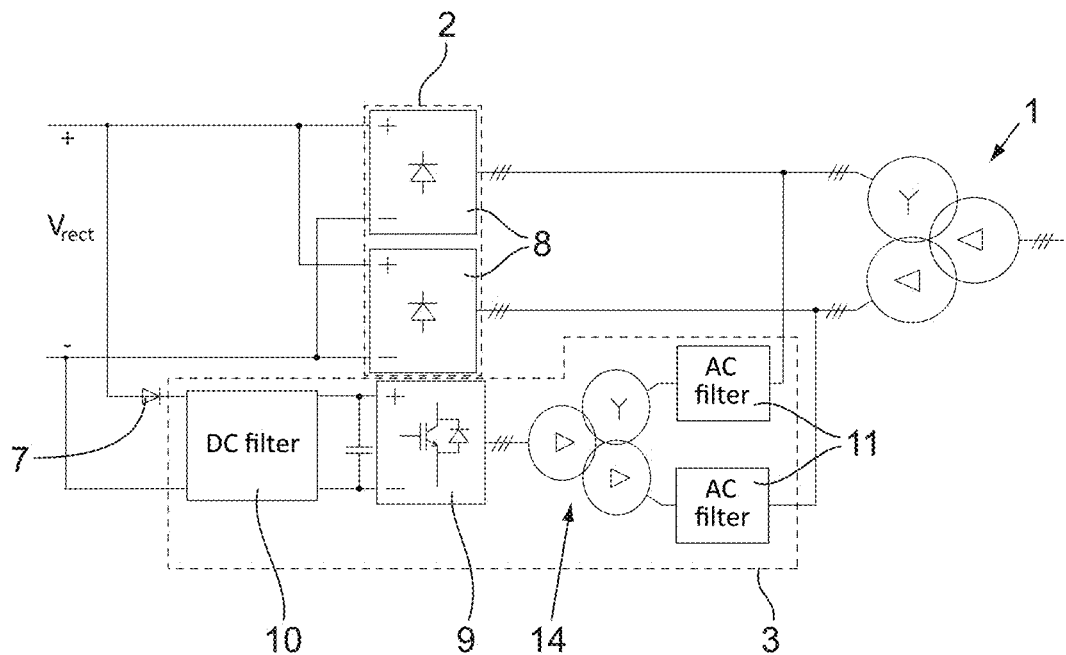
Figure 6:
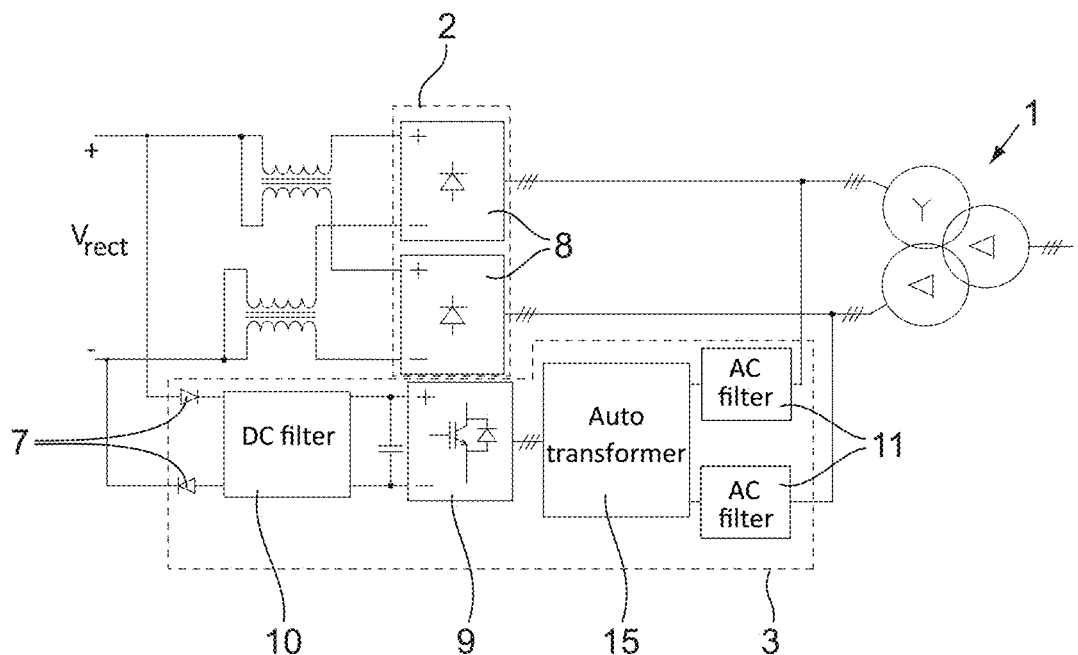
Figure 7:
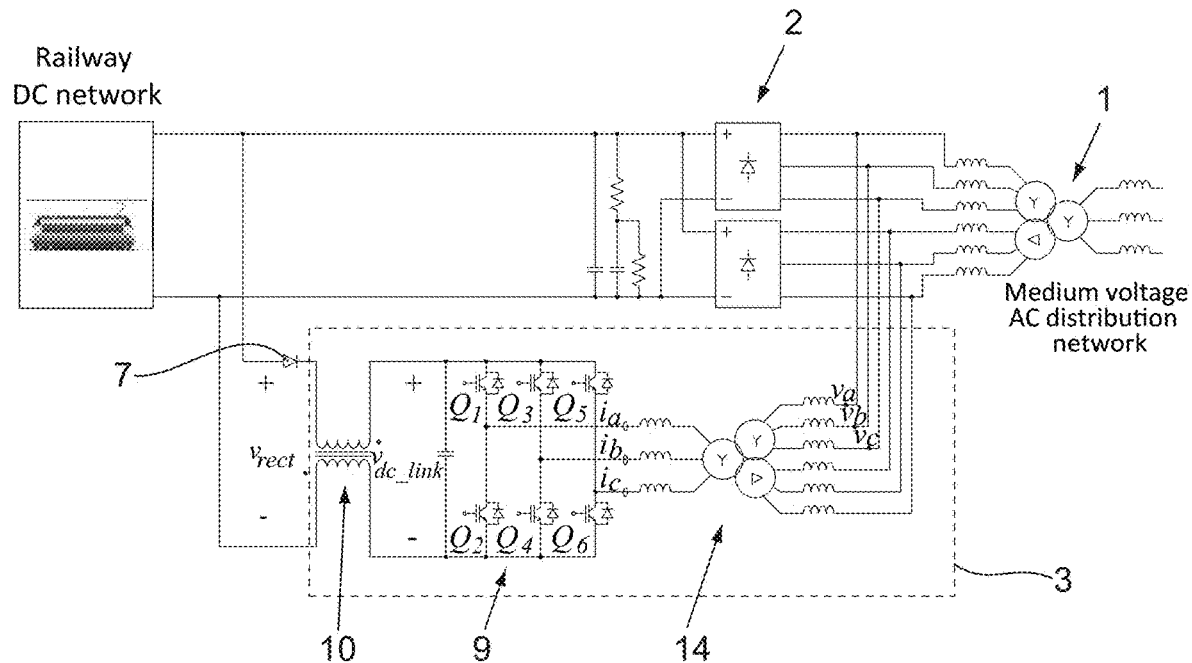
FIG. 7 shows a preferred implementation of the transformer, the diode rectifier and the inverter of the DC power supply device according to the invention.

In FIG. 7 is illustrated in more details an inverter 3 based on the architecture of FIG. 5 and having a two-level voltage source converter topology. In FIG. 7, protections, contactors, pre-charge circuits, etc., are omitted for the sake of simplicity. The winding leakage inductances at the terminals of the transformers 1, 14 are however shown and are used to perform the AC filter duties. Additional AC filtering components (inductors, capacitors) could be added in series or parallel with the leakage inductances of the transformer 14 to further reduce the switching harmonics of the AC voltage at the output side of the inverter 3. The key voltage and current measurements for control implementation are shown, including the DC voltage Vrect, the DC link voltage Vdc_link at the input of the three-phase power semiconductor bridge 9 and at the output of the DC filter 10, the AC currents ia, ib and is at the output of the three-phase power semiconductor bridge 9, the AC voltages va, vb and vc at one secondary winding of the transformer 14 and the power semiconductor (here, IGBT) switching signals Q1 to Q6.

Figure 8:
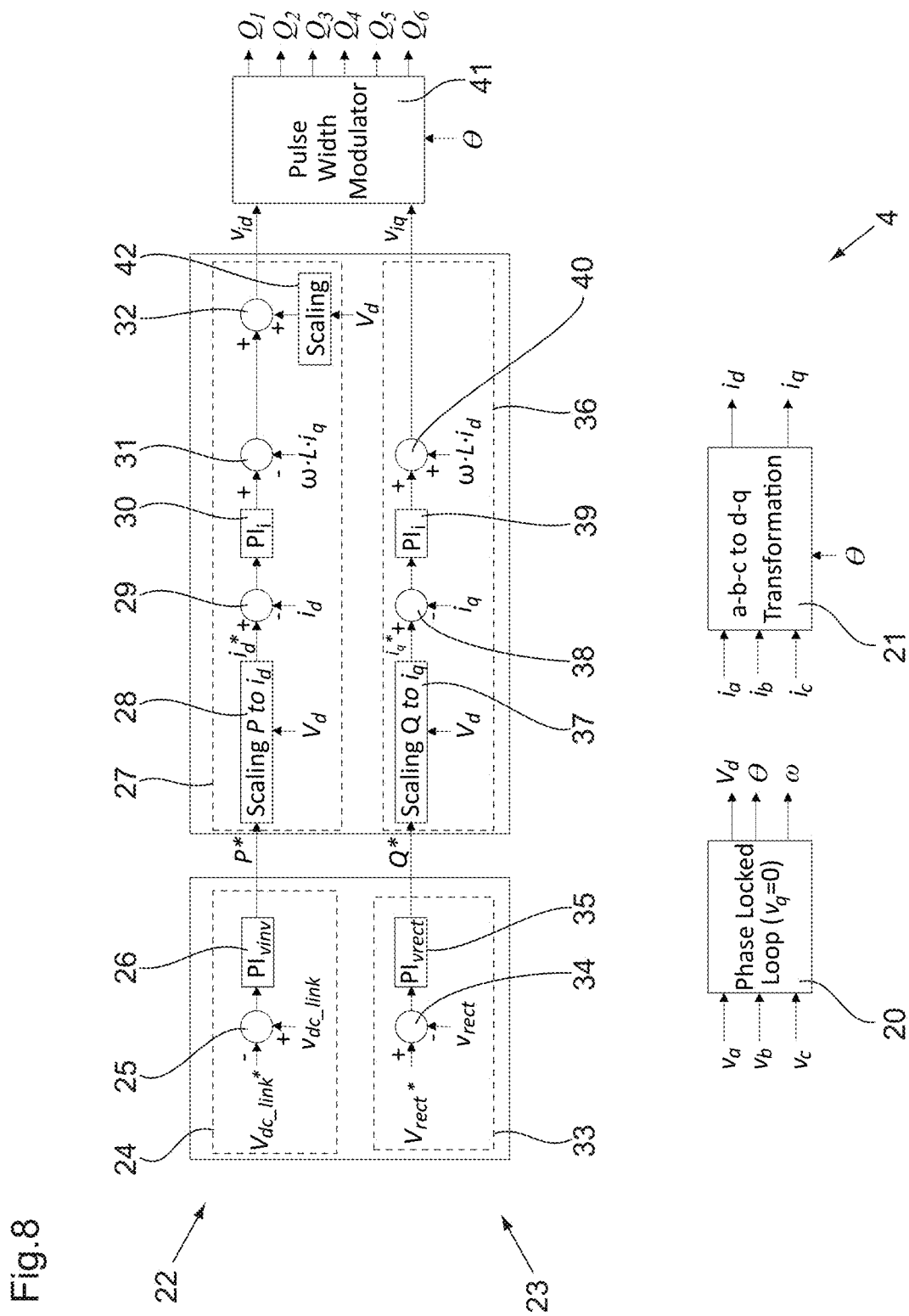
FIG. 8 shows a closed-loop controller of the DC power supply device according to the invention, which is arranged to control the inverter such that the inverter generates reactive power to regulate the DC output voltage of the diode rectifier.

FIG. 8 illustrates a typical implementation of the controller 4, which here is a closed-loop controller, based on a multi-loop control scheme. The controller 4 includes a phase locked loop 20, an a-b-c to d-q transformation unit 21, a DC-link inverter control line 22 and a DC rectifier control line 23.

The phase locked loop 20 is tuned to set the "q" coordinate of the AC voltage vq=0 and converts the three-phase voltages va, vb and vc into a voltage magnitude Vd, a phase angle θ and an angular frequency ω.

The a-b-c to d-q transformation unit 21 converts the three-phase currents ia, ib and is into two components id and iq in a synchronous reference frame (d-q frame) using the phase angle θ.

The function of the DC-link inverter control line 22 is known per se. It consists in regulating the DC link voltage Vdc_link so that the power semiconductor bridge 9 receives a sufficient voltage for its operation. The DC-link inverter control line 22 includes a DC voltage closed-loop controller 24 comprising, in series, a subtractor which subtract a target value Vdc_link* from the inverter DC link voltage Vdc_link and a proportional-integral (PI) compensator 26 which outputs an active power set point P*. The DC-link inverter control line 22 further includes an AC current closed-loop controller 27 comprising, in series, a scaling unit 28 for converting the active power set point P* into a reference current id* using the AC voltage magnitude Vd, a subtractor 29 for subtracting the actual current id output by the a-b-c to d-q transformation unit 21 from the reference current id*, a proportional-integral compensator 30, another subtractor 31 for subtracting the voltage ω·L·iq from the voltage output by the proportional-integral compensator 30, where L is the equivalent AC inductance seen from the output side of the inverter 3, and an adder 32 which adds the output signal of the subtractor 31 to the voltage magnitude Vd delivered through a scaling unit 42 to output a voltage command Vid for the inverter 3.

The DC rectifier control line 23 includes a DC voltage closed-loop controller 33 comprising, in series, a subtractor 34 which subtracts the rectifier DC voltage Vrect from a target value Vrect* and a proportional-integral (PI) compensator which outputs a reactive power set point Q*. The DC rectifier control line 23 further includes an AC current closed-loop controller 36 comprising, in series, a scaling unit 37 for converting the reactive power set point Q* into a reference current iq* using the AC voltage magnitude Vd, a subtractor 38 for subtracting the actual current iq output by the a-b-c to d-q transformation unit 21 from the reference current iq*, a proportional-integral compensator 39, and an adder 40 for adding the voltage output by the proportional-integral compensator 39 to the voltage ω·L·id, where L is the equivalent AC inductance seen from the output side of the inverter 3, so as to output a voltage command Viq for the inverter 3.

The voltage commands Vid and Viq are input into a pulse width modulator 41 together with the phase angle θ. The pulse width modulator 41 outputs the switching signals Q1 to Q6 to control the power semiconductor bridge 9 of the inverter 3. The pulse width modulator 41 may implement different known modulation schemes, such as Space Vector Modulation, Sinusoidal Modulation, a type of Discontinuous Pulse Width Modulation or others.

When the train is motoring, the inverter 3 cannot provide power to the DC network due to the presence of the blocking diode 7. The inverter DC link voltage Vdc_link is indeed higher than the rectifier DC voltage Vrect (i.e., Vdc_link*>Vrect*) so that the diode 7 is in the blocking condition. The compensator 26 drives the active power set point P* to a small value which allows compensating power losses of the inverter 3.

When the train is braking, the active power set point P* is set to the total regenerated power generated from the DC network into the AC network. In this scenario, the diode 7 starts conducting and Vrect≈Vdc_link.

As regards the DC rectifier control, when the train is motoring the compensator 35 drives the reactive power set point Q* such that Vrect is regulated to a target value Vrect*. When the train is braking, Vrect increases beyond a certain limit of voltage control and Q* is set to zero.

The AC current closed-loop controllers 27, 36 enable to regulate the power factor of the AC current at the output of the inverter 3. The AC current closed-loop controllers 27, 36 are useful in both modes of operation (train motoring and train braking) but control implementations without such inner AC current closed loop are also possible.

Figure 9:
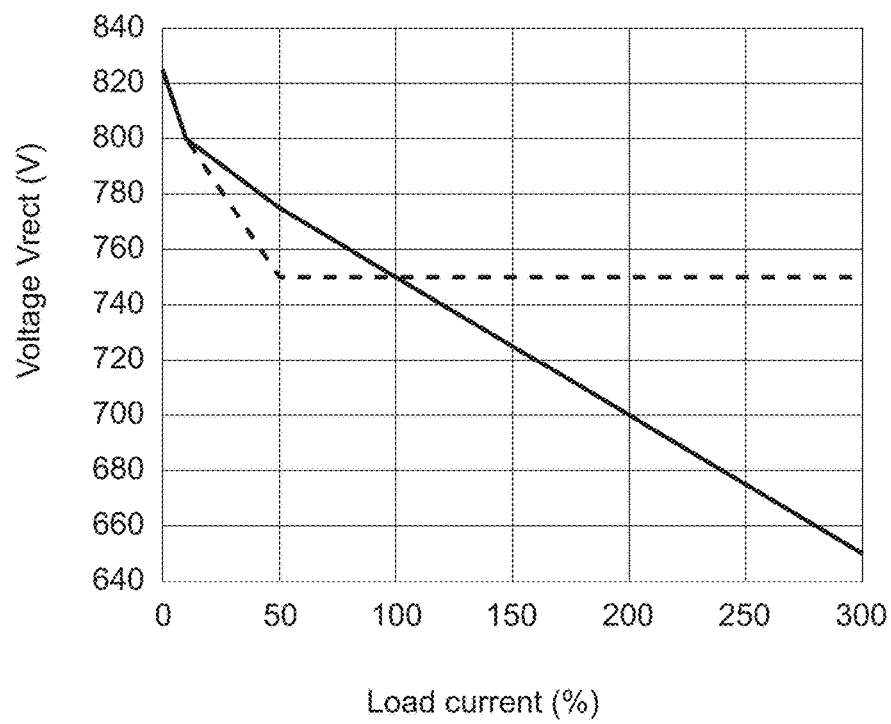
FIG. 9 shows the DC output voltage of the DC power supply device versus load current in two cases: without the DC voltage regulation according to the invention and with the DC voltage regulation according to a first operating example of the invention.

FIG. 9 shows the rectifier DC voltage Vrect as a function of load current (i.e. DC current consumed at the output side of the diode rectifier 2 by the DC network, a load current of 100% corresponding to the nominal DC current) without the DC voltage regulation according to the invention (inverter 3 disabled; continuous line in the diagram of FIG. 9) and with the DC voltage regulation according to the invention (inverter 3 and DC rectifier control line 23 enabled; dashed line in the diagram of FIG. 9). As can be seen, in the absence of the DC voltage regulation, the voltage drops as the load current increases, which causes the current to increase for a given power value and to generate dissipation, heat and risk of circuit breaking. When the inverter 3 is enabled, the DC rectifier control line 23 causes the inverter 3 to generate reactive power onto the secondary side of the transformer 1 so that the DC voltage Vrect is regulated to a target value, which can be either constant or varied depending on load current. In the shown diagram, the DC voltage Vrect starts being regulated at a load current of 10% and is gradually reduced down to 750 V, which is the nominal voltage of the diode rectifier 2 and of the DC network, at a load current of 50%. Beyond 50%, the DC voltage is maintained regulated to 750 V. The inverter DC-link voltage Vdc_link is then regulated through the active power set point P*.

The present invention thus has the advantage of using a cheap, reliable and long-lifetime rectifier, i.e., the diode rectifier 2, without suffering from the DC voltage drop which diode rectifiers normally exhibit when combined with a transformer.

In comparison with existing solutions for DC voltage regulation based on active power generation, an advantage of the present invention is the reduced power rating required for the inverter 3 to achieve regulation of the rectifier voltage. Indeed, reactive power is normally not useful in a DC power supply device. The present invention uses the reactive power circulating in the AC section of the device for the purpose of regulating the rectifier DC voltage.

Moreover, the unidirectional character of the inverter 3 makes it possible for the inverter 3 to have small dimensions since it can be dimensioned only for the regenerative power rather than for the total power. Inverters typically require a power rating ranging from 25% to 30% of the rectifier power for braking energy recovery purposes. In the present invention, the inverter 3 can be dimensioned only for the regenerative power and there is no need to increase the power rating of the inverter for voltage regulation purposes.

Figure 10:
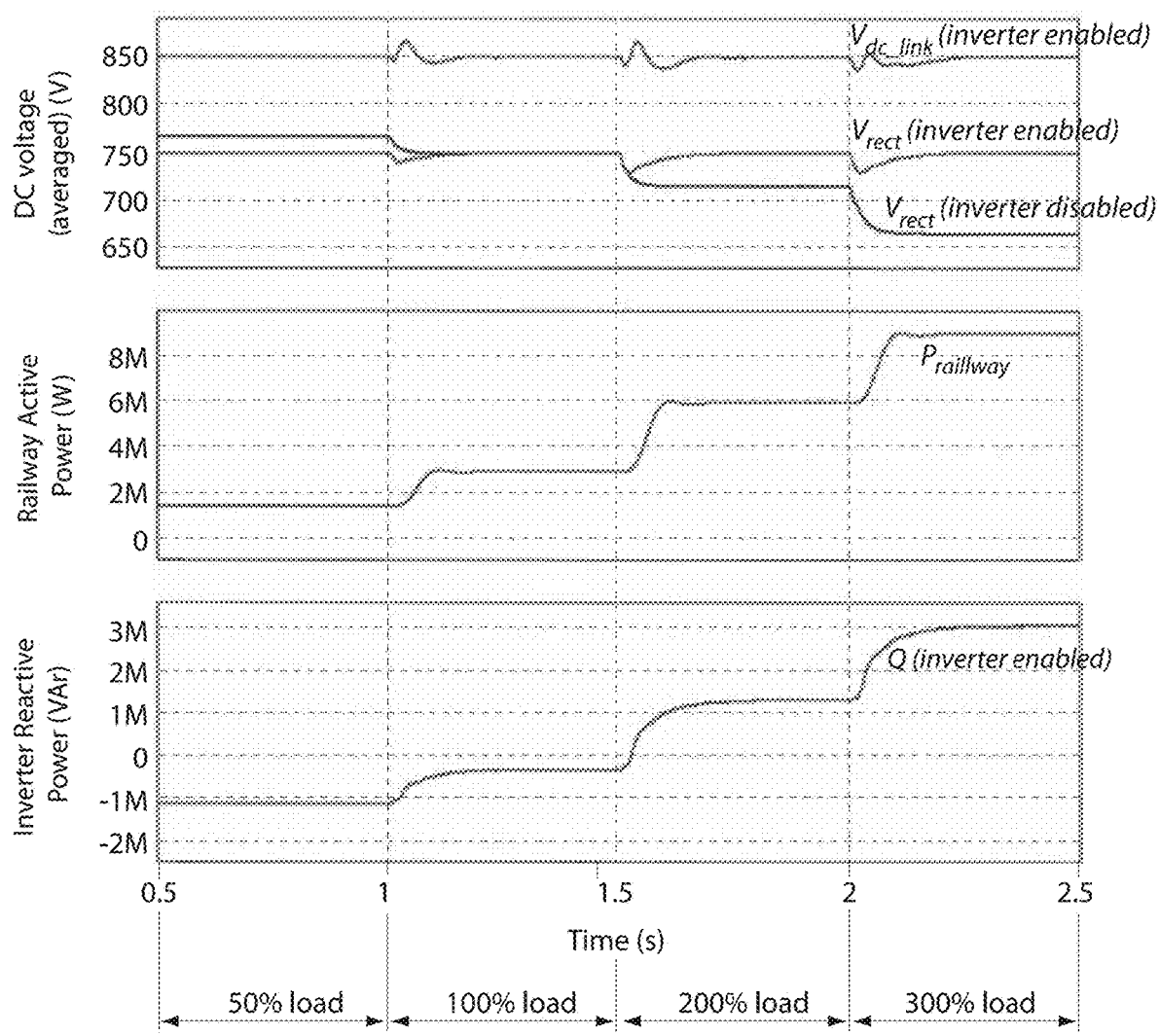
FIG. 10 shows the response of the DC output voltage of the DC power supply device when a train is in motoring operation, with the DC voltage regulation according to the first operating example of the invention and without the DC voltage regulation according to the invention.

Simulation results are presented in FIG. 10. The nominal voltage of the diode rectifier 2 and of the DC network is 750 V and the nominal power of the diode rectifier 2 is 3 MW. The railway network power is gradually stepped from 50% up to 300% (a load of 100% corresponding to the nominal power). When the inverter 3 is disabled, the rectifier voltage drops from 765 V down to 665 V. When the inverter 3 is enabled with the reactive power controller activated, the rectifier voltage is kept regulated to 750 V under all power levels. Up to a load power of about 100%, the inverter 3 generates some level of inductive power (reactive power with negative sign). As the load power increases beyond 100%, the inverter 3 generates capacitive power (reactive power with positive sign). The higher the level of rectifier voltage compensation, the higher the reactive power required.

It will be clearly apparent to a person skilled in the art that many modifications can be made in the embodiment of FIG. 8. For example, in the DC voltage closed-loop controller 24, 33 of the DC-link inverter control line 22 and/or of the DC rectifier control line 23, components based on PID (proportional-integral-derivative) compensators, model predictive control, etc., could be used instead of proportional-integral compensators. The AC current closed-loop controller 27, 36 could use other control loop solutions than the one disclosed above, e.g., stationary frame control or hysteresis control. In addition, the reactive power set point range could be limited only to positive values—the dashed line in FIG. 9 would then follow the continuous line for load currents between 0 and 100%—so as to perform only boosting of the rectifier DC voltage Vrect.

The regulation function fulfilled by the present invention can be complemented with a harmonics compensation function in order to further reduce the amount of current required from the inverter 3 to regulate Vrect. In this case, the rectifier DC voltage Vrect can be increased by compensating (partially or totally) the current harmonics drawn by the diode rectifier 2 which, similarly to the reactive power, also generate a voltage drop in the transformer 1. The required level of compensation can be commanded by a DC voltage closed-loop controller similar to the controllers 24, 33, or can be set for maximum compensation. The compensation of harmonics can be carried out using existing techniques applied for active power filtering, such as modulation schemes based on selective harmonic cancellation methods as disclosed in the article by I. Quesada et al. entitled "Evaluation of the boundaries of the solutions space for the Harmonic Cancellation Technique", Przegląd Elektrotechniczny, vol. 88, no. 1 a, pp. 21-25, 2012 or based on current control schemes with harmonics compensation networks as disclosed in the article by L. Limongi et al. entitled "Digital Current-Control Schemes", IEEE industrial Electronics Magazine, vol. 3, no. 1, 2009.

Figure 11:
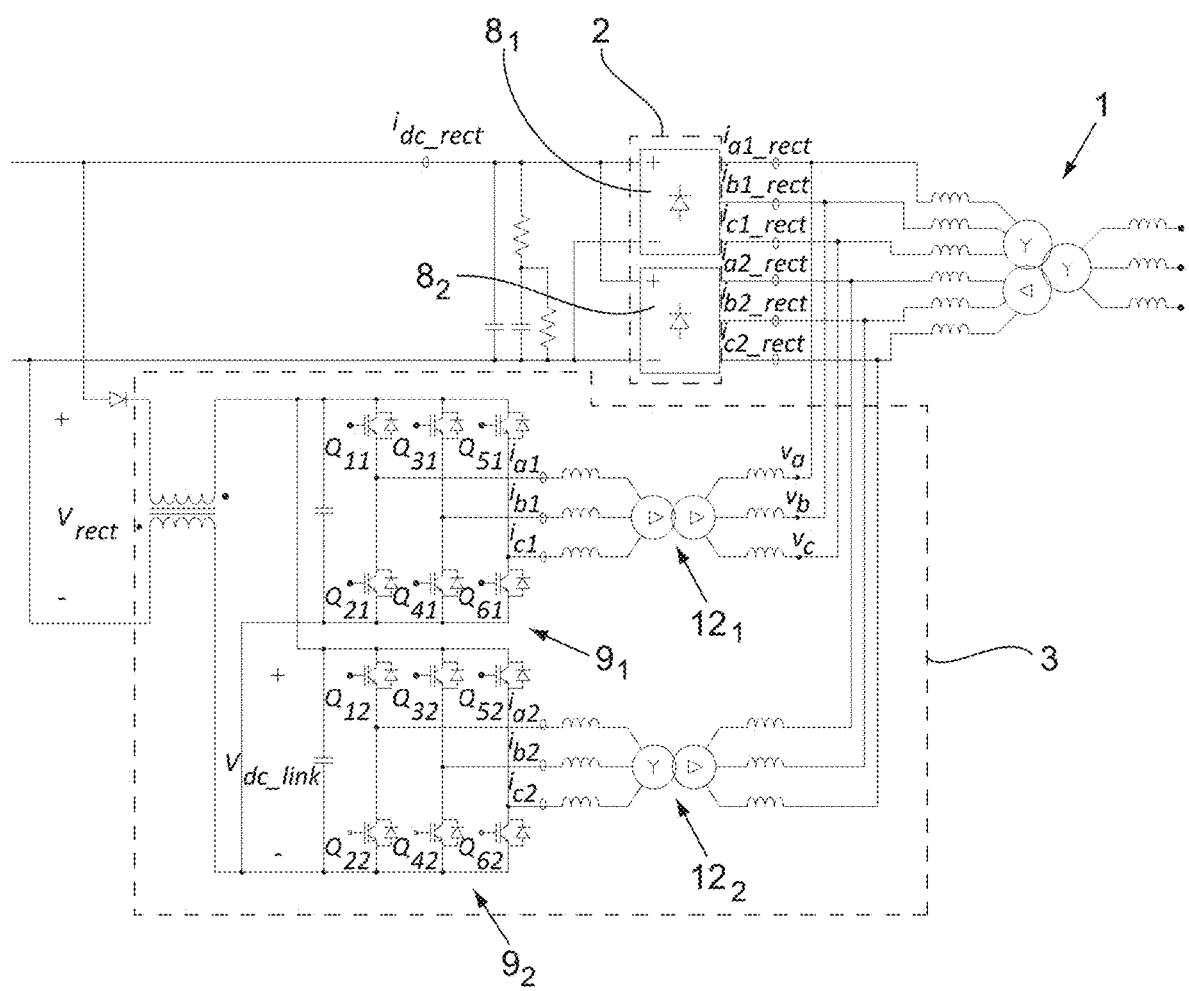
FIG. 11 shows another preferred implementation of the transformer, the diode rectifier and the inverter of the DC power supply device according to the invention.

An implementation example of the harmonics compensation method combined with the rectifier output voltage control method is described below. FIG. 11 shows a detailed implementation of an architecture that uses the AC interconnection concept shown in FIG. 3. This includes a transformer 1, a diode rectifier 2 with two six-pulse diode bridges 81, 82 and an inverter 3 with two IGBT inverter bridges 91, 92. The IGBT inverter bridges 91, 92 are respectively interconnected with the diode bridges 81, 82 through transformers 121, 122. In this example, the current measurement signals ia,b,c and switching command signals Q1-6 of the IGBTs of each inverter bridge 91, 92 are controlled separately. Signals with sub-index "1" correspond to the inverter bridge 91, and signals with sub-index "2" correspond to the inverter bridge 92. The input currents to the rectifier diode bridges 81, 82 are labelled as ia1_rect, ib1_rect, ic1_rect, ia2_rect, ib2_rect, ic2_rect, and the DC output current of the diode rectifier 2 is labelled as idc_rect.

Figure 12:
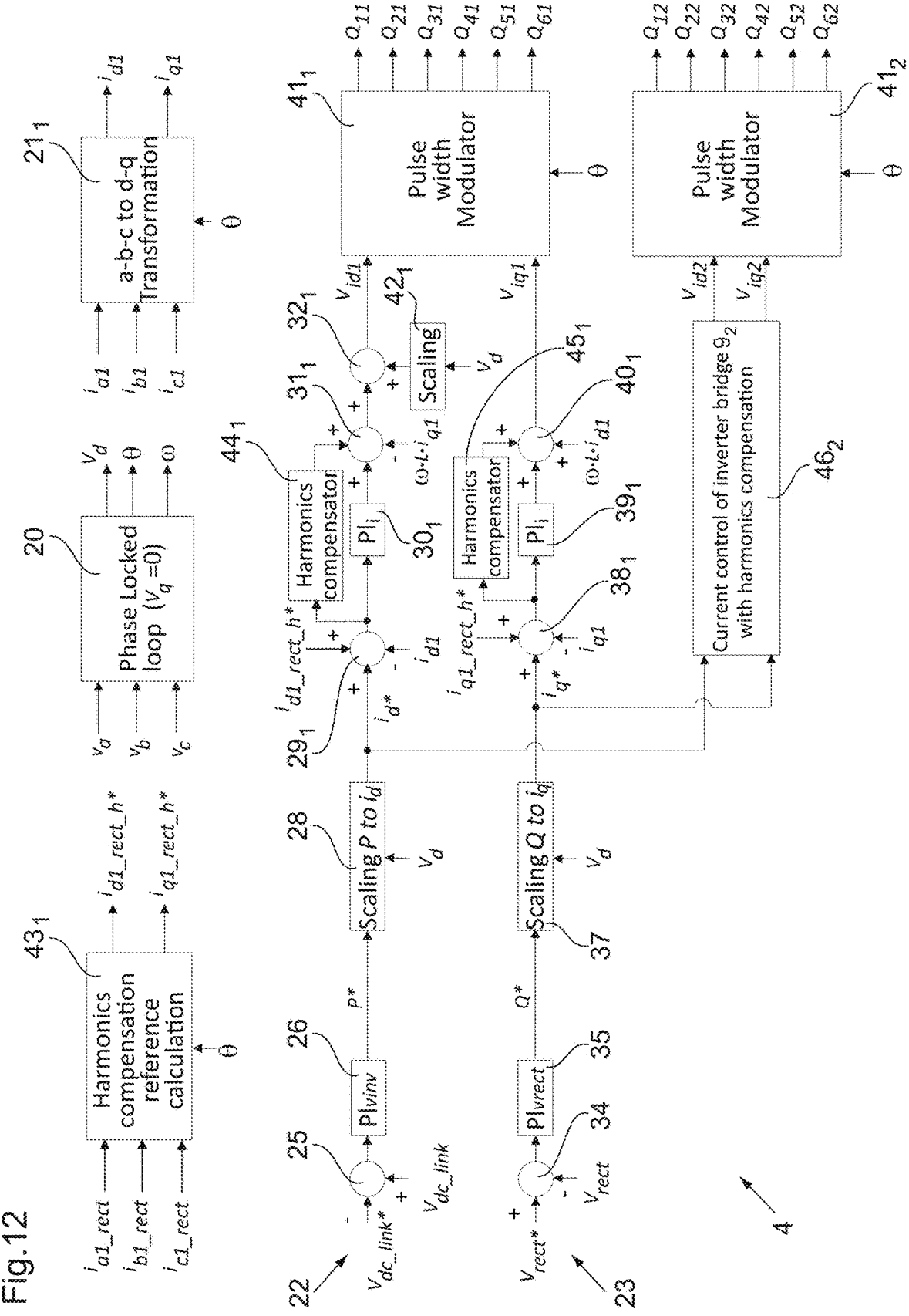
FIG. 12 shows a closed-loop controller arranged to control the inverter illustrated in FIG. 11 such that the inverter generates both reactive power and harmonics to regulate the DC output voltage of the diode rectifier.

FIG. 12 shows an implementation of the controller 4 based on current control for the harmonics compensation method combined with the rectifier output voltage control method. The controller 4, here a closed-loop controller, includes units 20, 25, 26, 28, 34, 35, 37 similar to the corresponding units in FIG. 8. The input rectifier currents ia1_rect, ib1_rect, ic1_rect at the first diode bridge 81 are measured and inputted to a harmonics compensation reference calculation unit 431. This unit 431 incorporates a transformation from a-b-c frame to d-q frame and filtering functions. The unit 431 outputs two reference signals id1_rect_h* and iq1_rect_h* that will include the harmonics of the diode bridge 81 to be compensated by the controller 4 with their sign adapted (the fundamental component is filtered out). The three-phase currents ia1, ib1, ic1 of the first inverter bridge 91 are converted by an a-b-c to d-q transformation unit 211 into two components id1, iq1 in a synchronous reference frame.

In an adder/subtractor 291 the signal id1 is subtracted from the sum of the reference signal id1_rect_h* and the reference signal id* coming from the scaling unit 28. A dedicated harmonic compensator 441 is typically added in parallel to a proportional-integral compensator 301 similar to the compensator 30 in FIG. 8 in order to enhance the compensation capabilities of the current controller 4 at the targeted harmonic frequencies. The signal ω·L·iq1 is subtracted from the sum of the outputs of units 441 and 301 in an adder/subtractor 311 and the result is provided to an adder 321 which adds it to the output of a scaling unit 421 receiving the voltage Vd output by the phase-locked loop 20. The adder 321 outputs a voltage command Vid1.

In an adder/subtractor 381 the signal iq1 is subtracted from the sum of the reference signal iq1_rect_h* and the reference signal iq* coming from the scaling unit 37. A dedicated harmonic compensator 451 is typically added in parallel to a proportional-integral compensator 391 similar to the compensator 39 in FIG. 8 in order to enhance the compensation capabilities of the current controller 4 at the targeted harmonic frequencies. The signal ω·L·id1 and the outputs of units 451 and 391 are added by an adder 401 to produce another voltage command Viq1. The voltage commands Vid1 and Viq1 are provided to a pulse width modulator 411 together with the phase angle θ output by the phase-locked loop 20. The pulse width modulator 411 outputs the switching signals Q11, Q21, Q31, Q41, Q51, Q61 to control the first inverter bridge 91.

The same units as 211, 431, 291, 301, 441, 311, 321, 421, 381, 391, 401, 451 are provided for the three-phase currents ia2, ib2, ic2 of the second inverter bridge 92 and the input rectifier currents ia2_rect, ib2_rect, ic2_rect at the second diode bridge 82 and shown as a single block 462 for the sake of simplicity. Voltage commands Vid2 and Viq2 are thus produced and provided to a pulse width modulator 412 together with the phase angle θ output by the phase-locked loop 20. The pulse width modulator 412 outputs the switching signals Q12, Q22, Q32, Q42, Q52, Q62 to control the second inverter bridge 92.

The harmonic compensators 441, 451 (and those of block 462) may be based on resonant compensators resonating at 6·ffund (which compensates the negative sequence of the 5th harmonic and the positive sequence of the 7th harmonic), and possibly other frequencies such as 12·ffund etc., where ffund is the fundamental frequency. As a result, the inverter voltage commands Vid and Viq are modulated so that the inverter AC current partially compensates the rectifier AC current harmonics. Other implementations for harmonics compensation based on multiple synchronous reference frames and other schemes are also possible (refer to article by Limongi et. Al. "Digital Current-Control Schemes", IEEE industrial Electronics Magazine, vol. 3, no. 1, 2009).

One will note that instead of being added to the control lines 22, 23 as is done in the embodiment of FIG. 12, the compensation of harmonics may replace the DC rectifier control line 23, i.e., a control line similar to the control line 23 in FIG. 8 may be used but for generating harmonics instead of reactive power, the harmonics being generated for the purpose of regulating the rectifier DC voltage Vrect.

As is apparent, in the embodiments of the invention described above the controller 4 receives the DC voltage Vrect as an input and uses this voltage as a feedback signal to control the inverter 3 so as to regulate the DC voltage Vrect to a target value Vrect*. The target value Vrect* may be constant or may vary as a function of the load current. In the latter case, a conventional DC current sensor placed at the output side of the diode rectifier 2 may provide DC load current data to the controller 4 to enable the controller 4 to vary the target value Vrect* according to a predetermined rule.

By using the DC voltage as a feedback signal inputted into the controller 4, the present invention has the advantage, with respect to the device disclosed in CN 212323740 U, of not requiring an expensive sensing scheme including voltage and current sensors at the input (AC side) of the diode rectifier to measure its reactive power and harmonics in order to compensate them.

Figure 13:
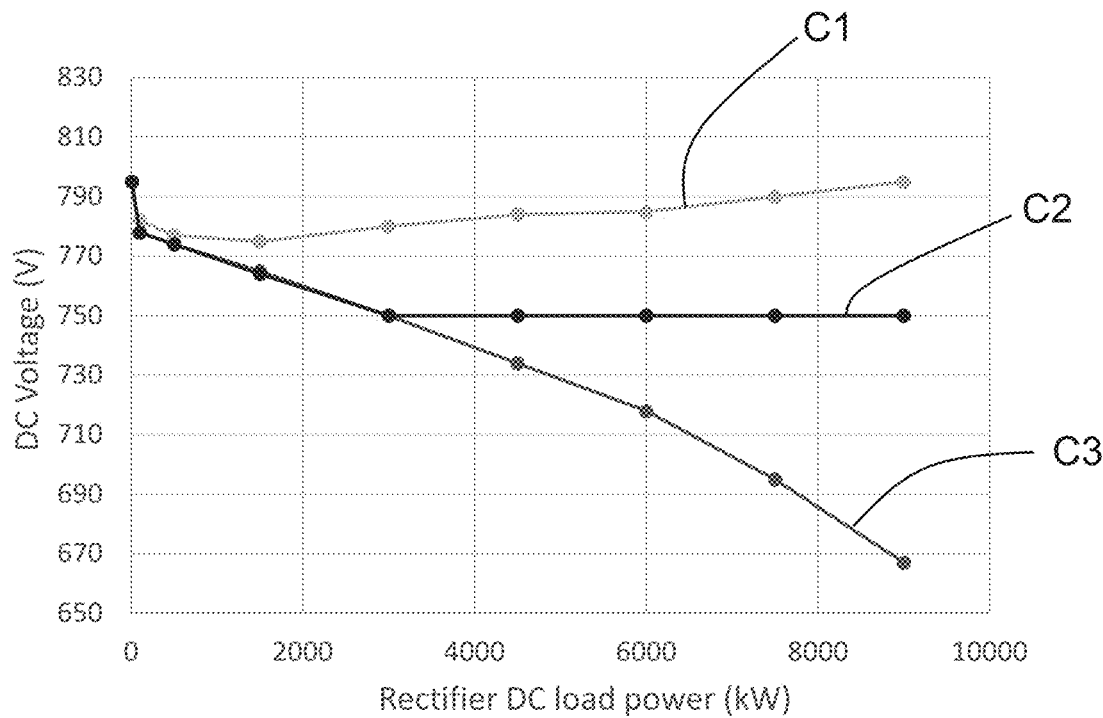
FIG. 13 shows simulation results of the DC output voltage of a DC power supply device using the control method as disclosed in CN 212323740 U versus the DC load power of its diode rectifier (curve C1), as well as simulation results of the DC output voltage of the DC power supply device according to the invention versus the DC load power of its diode rectifier in two cases: with the DC voltage regulation according to a second operating example of the invention (curve C2) and without the DC voltage regulation (curve C3)

Moreover, as is shown by the simulation curve C1 in FIG. 13, the DC voltage in the device disclosed in CN 212323740 U is maintained near the no-load voltage (about 790 V in FIG. 13) and thus well above the nominal voltage (750 V) because it is regulated over the entire operating range of the diode rectifier by fully compensating the reactive power and harmonics drawn by the diode rectifier. This results in a high power consumption by the inverter (see FIG. 14, curve C4). It is specified that for the simulation of the device disclosed in CN 212323740 U, an interphase transformer was incorporated between the DC positive terminals of the rectifier bridges since otherwise the amount of the 5th and 7th harmonics in the AC current circulating between the inverter and the diode rectifier was excessive.

On the other hand, in the present invention (see FIG. 13, curve C2), the controller 4 may control the inverter 3 such that:
  the inverter 3 is inactive when the DC voltage Vrect falls from the no-load voltage of the diode rectifier 2 to the nominal voltage of the diode rectifier 2 (750 V in the example),
  the inverter 3 becomes active when the DC voltage Vrect reaches the nominal voltage of the diode rectifier 2 to regulate said DC voltage to said nominal voltage across the operating range of the diode rectifier 2 from the nominal power (3000 kW in the example) to the maximum overload (300% of nominal power in the example).

In this manner, the power consumed by the inverter is much reduced (see FIG. 14, curve C5) and the global energy efficiency and equipment lifetime are increased. In particular, the power rating of the inverter 3 does not need to be higher than what is required for energy recovery, and the inverter 3 only needs to be operated when the DC voltage drops below the nominal voltage level.

Figure 14:
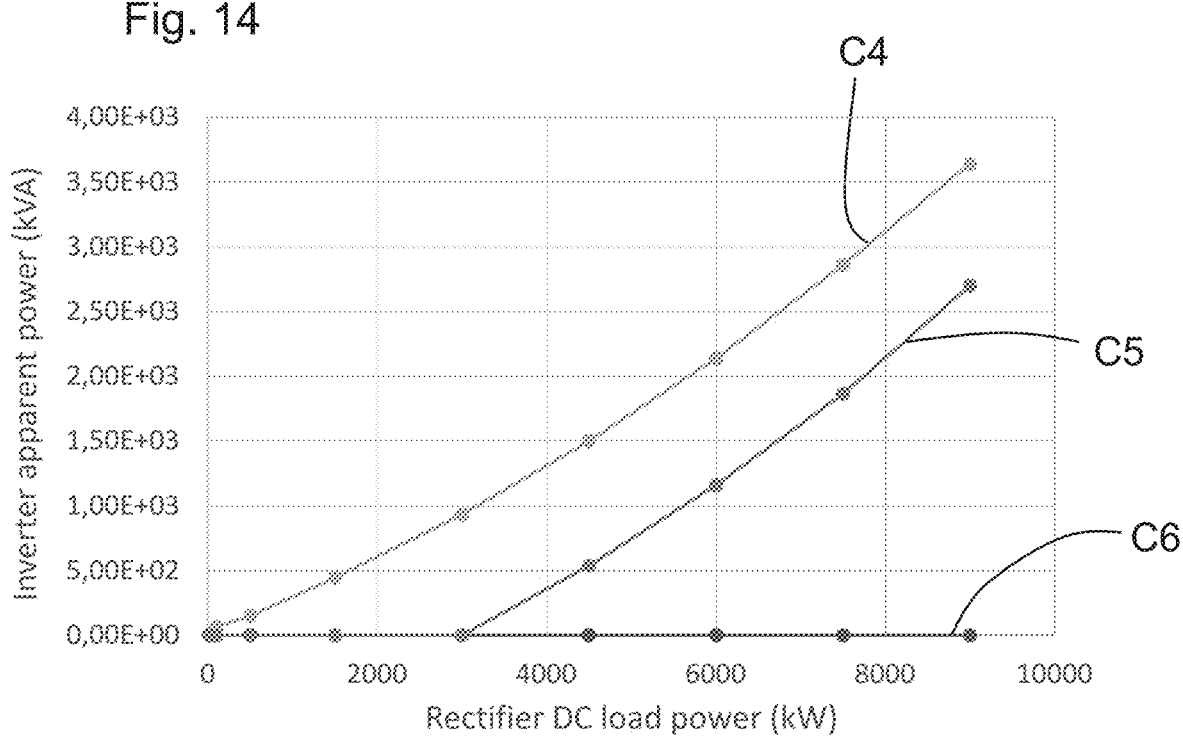
FIG. 14 shows simulation results of the apparent power of the inverter of the said DC power supply device using the control method as disclosed in CN 212323740 U versus the DC load power of its diode rectifier (curve C4), as well as simulation results of the apparent power of the inverter of the DC power supply device according to the invention versus the DC load power of its diode rectifier in two cases: with the DC voltage regulation according to the second operating example of the invention (curve C5) and without the DC voltage regulation (curve C6)

In FIGS. 13 and 14 has also been shown for comparison the evolution of the DC voltage Vrect and of the apparent power of the inverter 3 when the inverter 3 is disabled (curves C3 and C6).

In the example of FIGS. 13 and 14, like in the example shown in FIGS. 9 and 10, only reactive power is generated by the inverter 3 of the DC power supply device according to the invention to regulate the DC voltage Vrect. However, unlike in the example shown in FIGS. 9 and 10 where inductive power is generated before the 100% load to start the regulation, the reactive power in the example of FIGS. 13 and 14 is only capacitive and generated as from the 100% load.

Figure 15:
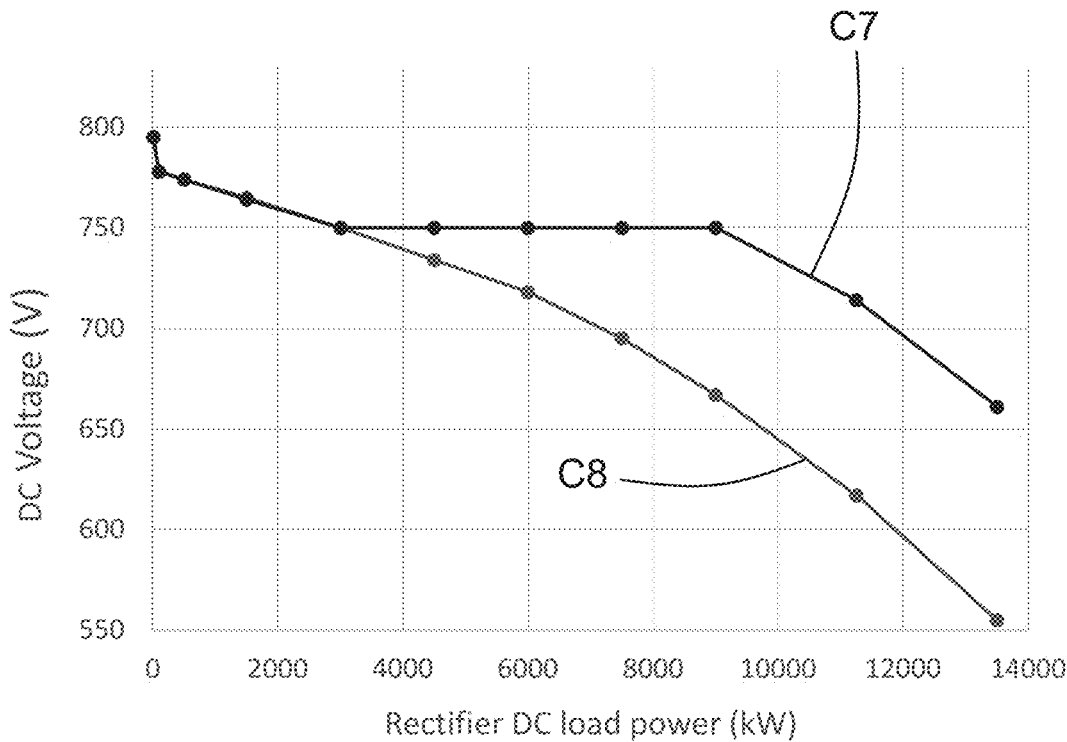
FIG. 15 shows simulation results of the DC output voltage of the DC power supply device according to the invention versus the DC load power of its diode rectifier in two cases: with the DC voltage regulation according to a third operating example of the invention (curve C7) and without the DC voltage regulation (curve C8)
Figure 16:
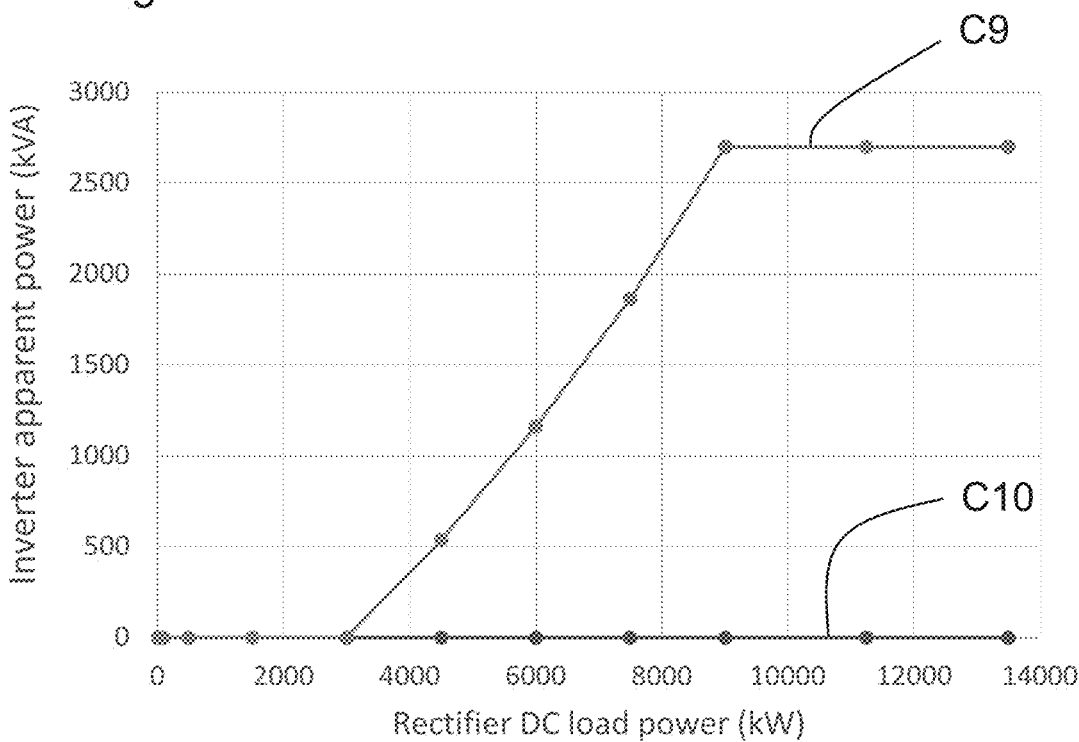
FIG. 16 shows simulation results of the apparent power of the inverter of the DC power supply device according to the invention versus the DC load power of its diode rectifier in two cases: with the DC voltage regulation according to the third operating example of the invention (curve C9) and without the DC voltage regulation (curve C10)

FIGS. 15 and 16 show another operating example of the DC power supply device according to the invention. In this example (see curve C7), the diode rectifier is assumed to have a maximum overload capacity of 450%. The DC voltage Vrect is regulated to the nominal voltage across the operating range from the nominal load power to e.g. 300% load power and then is regulated to a target value which is lower than the nominal voltage but remains higher than the DC voltage without regulation (see curve C8) and which decreases as a function of load power. In particular, as shown, the varying target value may be chosen so that the voltage drop compensation remains constant beyond 300% load power and up to the maximum overload, i.e. 450%, thereby enabling the power consumption of the inverter 3 to be clamped (see curve C9) so that the inverter 3 does not need to be over-dimensioned only for the purpose of regulating the DC voltage.

Regulating the DC voltage Vrect to the nominal voltage of the diode rectifier 2 and starting the regulation at the nominal voltage are preferred for simplicity and energy efficiency reasons. However, in alternative embodiments, the regulation may start at a predetermined value for the DC voltage Vrect which is lower than the no-load voltage of the diode rectifier 2 but different from (higher or lower than) the nominal voltage.

In general manner, in the present invention the regulation may start when the DC voltage Vrect, falling from the no-load voltage of the diode rectifier 2, reaches a predetermined voltage (equal to or different from the nominal voltage), with the DC voltage Vrect being regulated to a constant or varying target value that is equal to or lower than the predetermined voltage. The difference between the no-load voltage and the predetermined voltage is typically at least 25%, preferably at least 50%, preferably at least 75% of the difference between the no-load voltage and the nominal voltage of the diode rectifier 2. The difference between the no-load voltage and the predetermined voltage is typically at most 125%, preferably at most 110% of the difference between the no-load voltage and the nominal voltage of the diode rectifier 2.

Figure 17:
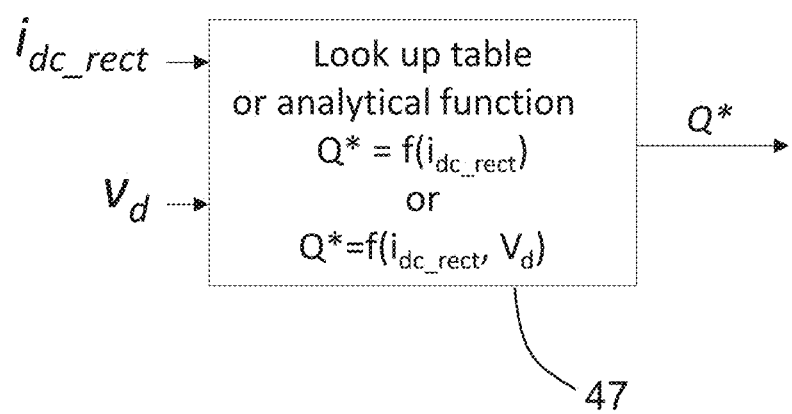
FIG. 17 shows an alternative implementation of part of the controller which controls the inverter in the DC power supply device according to the invention, using as an input signal the DC rectifier output current instead of the DC rectifier output voltage.
Figure 18:
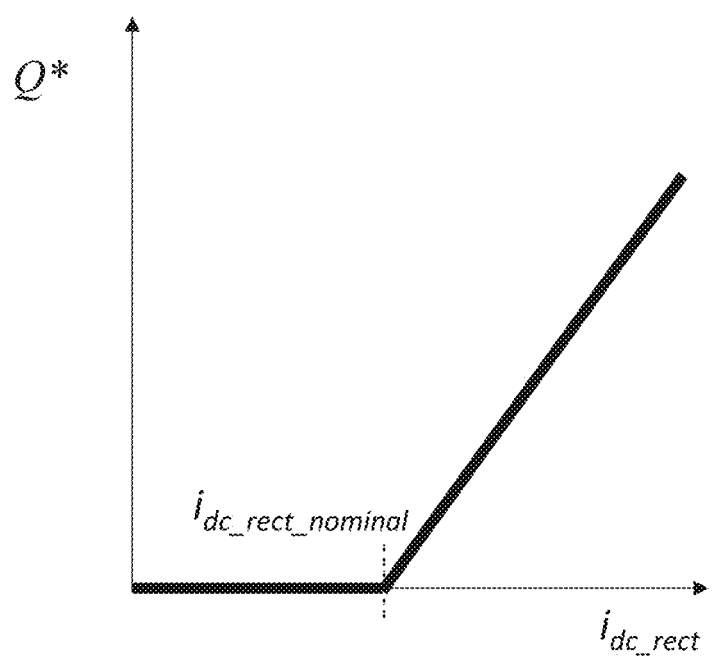
FIG. 18 shows a predetermined relationship between the DC rectifier output current and a reactive power set point which can be used in the implementation of FIG. 17.
Figure 19:
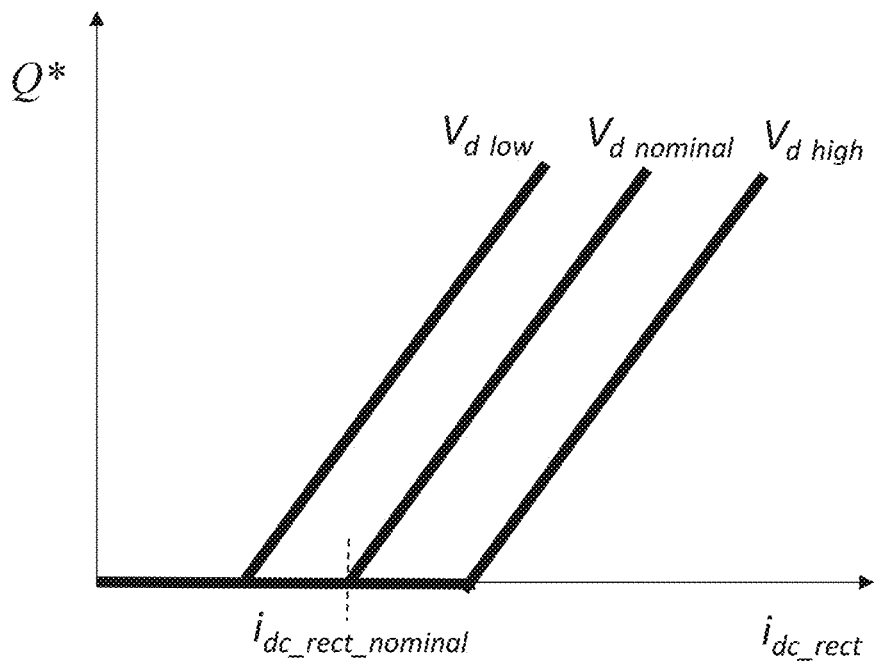
FIG. 19 shows a predetermined relationship between the DC rectifier output current, an AC voltage and a reactive power set point which can be used in the implementation of FIG. 17.

In all embodiments described above, the controller 4 controls the inverter 3 using the DC voltage Vrect as a feedback signal. In other embodiments, however, the controller 4 may control the inverter 3 using the DC current outputted by the diode rectifier 2 instead of, or in addition to, the DC voltage Vrect. FIG. 17 shows such an embodiment, in which the DC voltage closed-loop controller 33 of FIG. 8 or the corresponding DC voltage closed-loop controller of FIG. 12 is replaced with a look-up table or analytical function 47 which modulates the reactive power set point Q* as a function of the DC rectifier output current idc_rect using a predetermined relationship between the DC rectifier output current and the reactive power set point. This input-output relationship is calculated aiming to compensate the voltage drop at the DC side caused by an increase of the DC rectifier output current, and can take also the AC voltage Vd as an input. FIGS. 18 and 19 show two examples of input-output relationship implementations based on a simple linear approach. The example of FIG. 18 takes only the DC rectifier output current as an input. The example of FIG. 19 takes both the DC rectifier output current and the AC voltage as inputs. The regulation of the DC voltage using the DC rectifier output current instead of the DC voltage itself is less accurate because the relationship between reactive power injection, AC voltage, DC voltage and DC current is based on a model, i.e. there is no closed-loop control action that compensates the difference between the target DC voltage level and the measured DC voltage level. However, such a regulation also has great advantages:

- it has a higher control bandwith: the response time is basically defined by the inner current loop of the inverter;
- it is simpler: there is no need to tune the outer control loop, thus avoiding potential stability issues;
- it does not require a DC rectifier voltage sensor.

Figure 20:
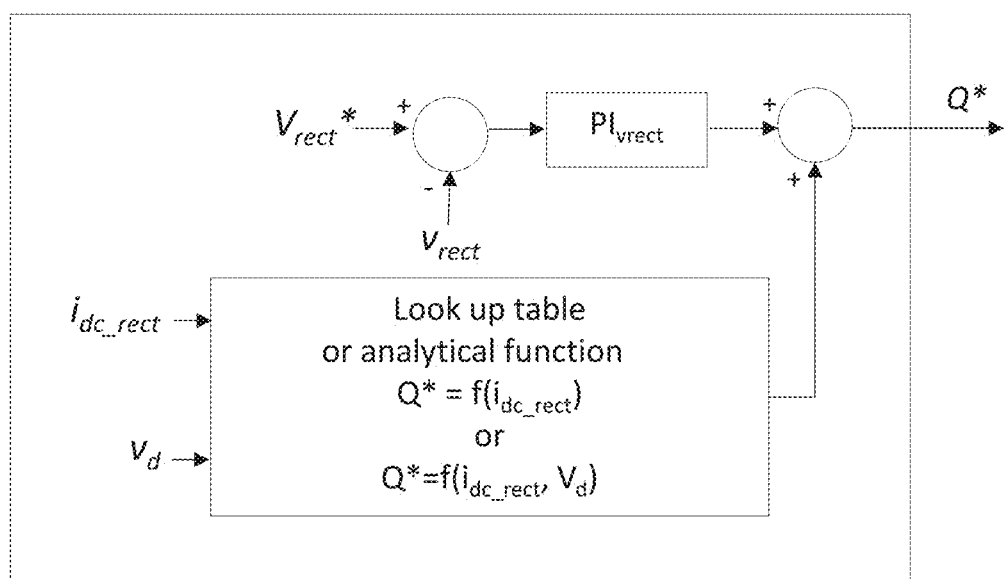
FIG. 20 shows another alternative implementation of part of the controller which controls the inverter in the DC power supply device according to the invention, using as input signals both the DC rectifier output current and the DC rectifier output voltage.

A combination of both techniques may be used, so that the DC current measurement allows accelerating the response time of the system while the DC voltage closed-loop control performs a fine adjustment of the reactive power set point to control the voltage exactly to the targeted level. FIG. 20 illustrates an implementation that integrates both methods.

The invention claimed is:

1. A DC power supply device comprising:
    a transformer having a primary side and a secondary side,
    a diode rectifier connected at its input side to the secondary side of the transformer,
    an inverter connected at its output side to the secondary side of the transformer, and
    a controller arranged to control the inverter such that the inverter generates reactive power onto the secondary side of the transformer so as to regulate the DC voltage at the output side of the diode rectifier to a target value, wherein the controller receives at its input side at least one DC signal outputted by the diode rectifier and uses said at least one DC signal to control the inverter.

2. The DC power supply device as claimed in claim 1, wherein the controller is arranged to control the inverter such that the inverter is inactive when said DC voltage falls from the no-load voltage of the diode rectifier to a predetermined voltage and such that the inverter becomes active when said DC voltage reaches the predetermined voltage to regulate said DC voltage to said target value.

3. The DC power supply device as claimed in claim 2, wherein said target value is equal to or lower than the predetermined voltage.

4. The DC power supply device as claimed in claim 2, wherein said target value varies as a function of the DC current outputted by the diode rectifier.

5. The DC power supply device as claimed in claim 2, wherein the difference between the no-load voltage and the predetermined voltage is at least 25% of the difference between the no-load voltage and the nominal voltage of the diode rectifier.

6. The DC power supply device as claimed in claim 2, wherein the difference between the no-load voltage and the predetermined voltage is at most 125% of the difference between the no-load voltage and the nominal voltage of the diode rectifier.

7. The DC power supply device as claimed in claim 2, wherein the predetermined voltage is substantially equal to the nominal voltage of the diode rectifier.

8. The DC power supply device as claimed in claim 2, wherein the controller is arranged to control the inverter such that the inverter generates reactive power and harmonics onto the secondary side of the transformer so as to regulate the DC voltage at the output side of the diode rectifier to the target value.

9. The DC power supply device as claimed in claim 1, wherein the secondary side of the transformer has at least two secondary windings each connected to the diode rectifier and to the inverter.

10. The DC power supply device as claimed in claim 1, wherein the transformer is a delta-wye transformer.

11. The DC power supply device as claimed in claim 1, wherein the diode rectifier includes at least one six-pulse diode bridge.

12. The DC power supply device as claimed in claim 1, wherein the diode rectifier includes at least two diode bridges.

13. The DC power supply device as claimed in claim 1, wherein the inverter includes at least one power semiconductor bridge.

14. The DC power supply device as claimed in claim 1, wherein the controller is arranged to pulse-width modulate the inverter.

15. The DC power supply device as claimed in claim 1, wherein the inverter is unidirectional.

16. The DC power supply device as claimed in claim 1, wherein the controller includes an AC current closed-loop controller driven by a DC voltage closed-loop controller.

17. The DC power supply device as claimed in claim 1, wherein said at least one DC signal comprises said DC voltage.

18. The DC power supply device as claimed in claim 17, wherein the controller comprises a DC voltage closed-loop controller to control the inverter based on said DC voltage.

19. The DC power supply device as claimed in claim 1, wherein said at least one DC signal comprises the DC current outputted by the diode rectifier.

20. The DC power supply device as claimed in claim 19, wherein the controller uses a loop-up table or an analytical function to control the inverter based on said DC current.

21. A railway substation including a DC power supply device as claimed in claim 1.

22. The railway substation as claimed in claim 21, wherein the inverter is arranged to regulate the DC voltage at the output side of the diode rectifier under the control of the closed-loop controller during the traction of a vehicle and to recover DC power during the braking of a vehicle for injection into an AC distribution network.

23. A DC power supply device comprising:
   a transformer having a primary side and a secondary side,
   a diode rectifier connected at its input side to the secondary side of the transformer,
   an inverter connected at its output side to the secondary side of the transformer, and
   a controller arranged to control the inverter such that the inverter generates harmonics onto the secondary side of the transformer so as to regulate the DC voltage at the output side of the diode rectifier to a target value,
wherein the controller receives at its input side at least one DC signal outputted by the diode rectifier and uses said at least one DC signal to control the inverter.

* * * * *